Jan. 19, 1932.  L. A. ROGERS  1,842,365
APPARATUS FOR THE PRESERVATION OF CHEESE
Filed Feb. 8, 1929
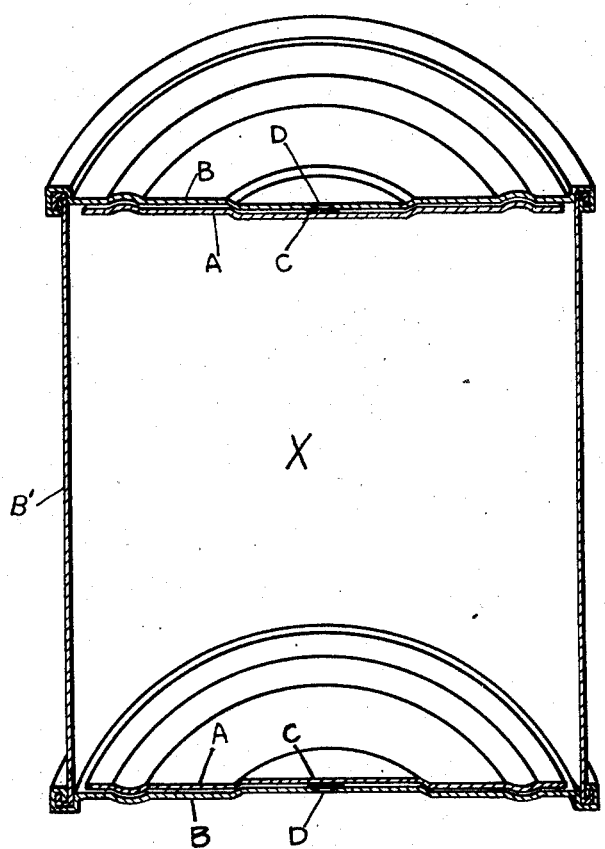

Patented Jan. 19, 1932

1,842,365

UNITED STATES PATENT OFFICE

LORE ALFORD ROGERS, OF WASHINGTON, DISTRICT OF COLUMBIA; DEDICATED BY ASSIGNMENT UNTO THE GOVERNMENT AND THE PEOPLE OF THE UNITED STATES OF AMERICA

APPARATUS FOR THE PRESERVATION OF CHEESE

Application filed February 8, 1929. Serial No. 338,491.

(GRANTED UNDER THE ACT OF MARCH 3, 1883, AS AMENDED APRIL 30, 1928; 370 O. G. 757)

This application is made under the act approved April 30, 1928, and the invention herein described may be manufactured and used by or for the Government for governmental purposes without payment to me of any royalty thereon.

It is well recognized that the general use of cheese is restricted by the inconvenient and uneconomical package in which it is usually made. This is especially true of the ordinary Cheddar type which is the kind most extensively made in this country. Even the smaller sizes are too large for domestic use and they must be cut up by the retailer. There is a loss in the cut cheese through evaporation and the small pieces become dry and unappetizing. This objection has been overcome to some degree by processing the cheese and packing in cans or foil covered packages. This however materially changes the character of the cheese and destroys some of the desirable qualities.

Cheese has certain inherent qualities which make it very difficult to seal it in any package satisfactory for marketing. One is its suitability for mold growth. To prevent molding it is necessary to protect the surface from the oxygen of the air which is essential to the growth of molds. The second quality is the gas formation which takes place almost continuously in the normal cheese. This is not an indication of spoilage as it would be in most food products, but is a by-product in the normal ripening. Abnormal fermentations may take place in which this gas formation is increased. It is for this reason that attempts to can cheese have failed. Cheese may be pressed into forms to fit cans or pressed in the standard hoops and cut to fit cans. Sealed in cans in this way without appreciable air spaces the cheese ripens normally without loss of moisture. In fact the soft, mellow texture obtained by ripening in cans would be preferred by most consumers.

The molding is prevented by the complete exclusion of air but a large percentage of the cans swell and are consequently unsalable.

In my invention, I seal the cheese in cans provided with a valve which will permit the escape of the gas produced in the cheese, but will prevent the ingress of air and thus prevent molding.

This is accomplished by the employment of the can shown on the accompanying drawing, in which the figure represents a side elevation of the entire can, partly in section.

The can X is of the conventional type having sides $B^1$ and covers B and, in addition, is equipped with metal discs A inside the can X and adjacent the tops or covers B. These discs A are equipped with pieces of rubber C or other suitable material which are affixed to the center of the sides of the discs next to the covers of the can, and coincide with apertures D in the covers of the can. After the can has been filled with cheese and the can has been sealed, the cheese will, in its normal condition, press the discs A against the covers B of the can, and the rubber pieces C will be held tightly against the apertures D in the covers B, thus preventing the inflow of air into the can. If sufficient gas is formed by the cheese within the can X to cause the covers B to bulge the pieces of rubber C will then be out of contact with the covers B and the gas will escape through apertures D. It will be obvious that any type of valve that will permit the escape of gas without allowing air to enter will serve the purpose. It will also be obvious that after the gases formed in the can have escaped, the pressure on the can covers that cause the same to bulge will be relieved and the covers will return to their normal position.

It is necessary to provide discs or valves at the top and bottom of the can because the cheese closes the can so completely that there is little or no movement of gas from one end to the other. The cheese may be put in the cans as it comes from the press, when it is fully ripe, or at any intermediate period. If the former course is pursued the waste cheese occurring when the cheese is cut to fit the cans may be returned to the vat at the proper stage of manufacture and reincorporated in a new cheese. If it is canned at a later period the waste may be used in making process cheese.

I claim:

A can for preserving cheese comprising sides and end covers, said covers having apertures in their central portions, metal discs within said can and adjacent said covers, and closure members for said apertures affixed to the said metal discs.

LORE ALFORD ROGERS.